United States Patent
Aigo (10) Patent No.: US 6,931,485 B2
(45) Date of Patent: Aug. 16, 2005

(54) DISK ARRAY APPARATUS

(75) Inventor: Takao Aigo, Minato-ku (JP)

(73) Assignee: NEC Corporation, Tokyo (JP)

( * ) Notice: Subject to any disclaimer, the term of this patent is extended or adjusted under 35 U.S.C. 154(b) by 424 days.

(21) Appl. No.: 10/216,564

(22) Filed: Aug. 12, 2002

(65) Prior Publication Data

US 2003/0037207 A1 Feb. 20, 2003

(30) Foreign Application Priority Data

Aug. 15, 2001 (JP) ........................................ 2001-246442

(51) Int. Cl.$^7$ ............................................. G06F 12/00
(52) U.S. Cl. .................. 711/113; 711/128; 711/129; 711/141; 711/142; 711/143; 711/161; 711/162
(58) Field of Search ................................. 711/113, 128, 711/129, 141, 142, 143, 161, 162

(56) References Cited

U.S. PATENT DOCUMENTS 6,105,116 A * 8/2000 Mori ........................... 711/162

FOREIGN PATENT DOCUMENTS

| JP | H06-44010 A | 2/1994 |
| JP | H07-210439 A | 8/1995 |
| JP | H08-87450 A | 4/1996 |

* cited by examiner

Primary Examiner—Nasser Moazzami
Assistant Examiner—Ngoc V Dinh
(74) Attorney, Agent, or Firm—Sughrue Mion, PLLC (57) ABSTRACT

A cache memory comprises a group of cache pages which are normal data areas, and a group of work pages each for saving DIRTY data in an associated cache page. When write data transferred from a host computer is written into said cache memory, a host interface controller saves data in a portion in which a write range overlaps a DIRTY range into a work page, and retrieves the data saved in the work page to an associated cache page when a transfer of the write data is interrupted. A disk interface controller writes back the DIRTY data on said cache memory.

10 Claims, 8 Drawing Sheets

DISK ARRAY APPARATUS

BACKGROUND OF THE INVENTION

1. Field of the Invention

The present invention relates to a disk array apparatus which has a built-in cache memory, and more particularly, to a disk array apparatus (a disk array apparatus having a data protection function) which can protect data before a transfer of write data is interrupted, even if the data transfer is interrupted due to a failure in a host computer, a failure in a host interface cable (a cable between the host computer and disk array apparatus), and the like.

2. Description of the Related Art

Generally, upon receipt of a write request (data write request) from a host computer, a disk array apparatus having a built-in cache memory returns a response to the host computer at the time received data (write data) is stored on the cache memory, and writes the data into a disk drive (physical disk) asynchronously with an I/O (Input/Output) operation between the host computer and disk array apparatus to improve the performance.

When a transfer of write data is interrupted due to a failure in the host computer, a failure in a host interface cable, or the like during the transfer of the write data from the host computer, the disk array apparatus cannot ensure contents of data which should be written thereinto in the transfer of write data.

To address this problem, a conventional disk array apparatus embeds data in the write range with information which indicates that the data is error data which cannot be corrected, when the disk array apparatus receives the data at a later time.

Figure 1:
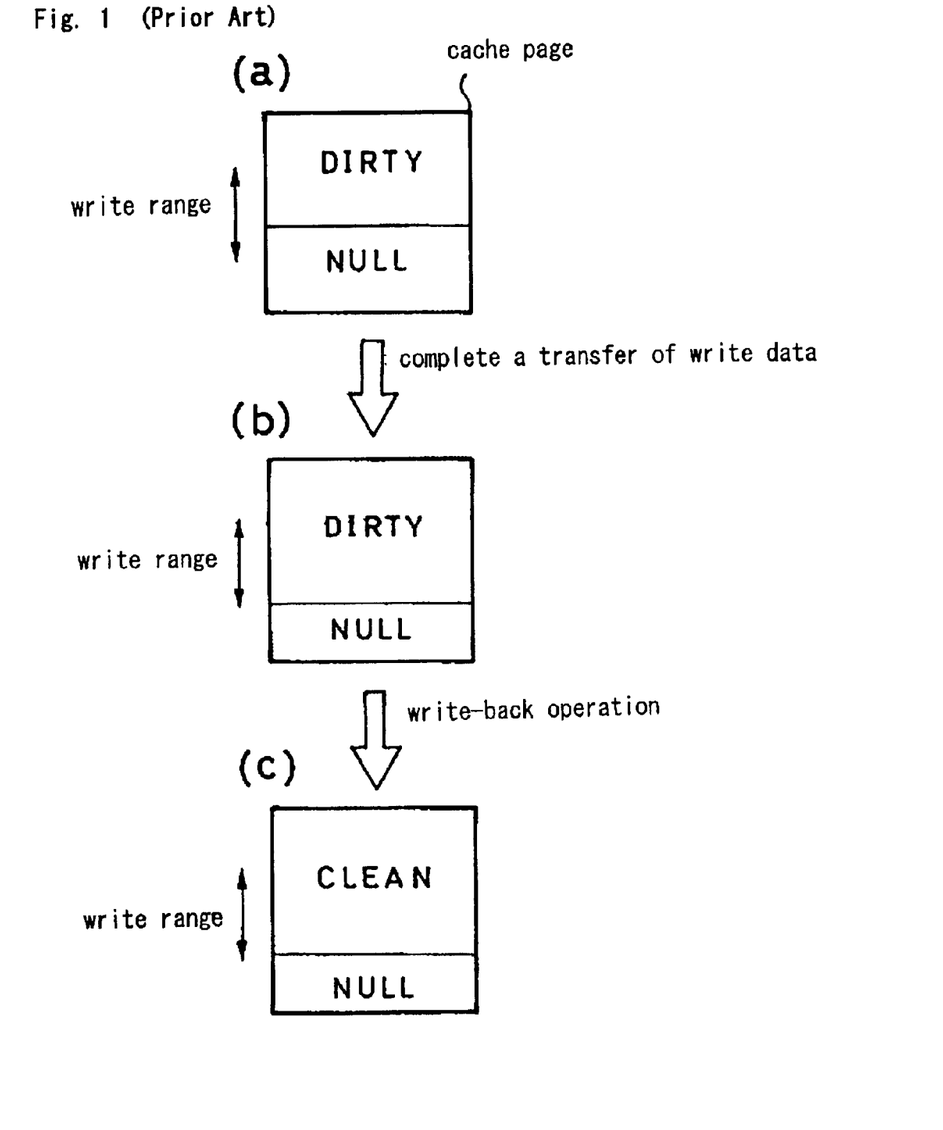
FIGS. 1(a) to 1(c) are diagrams for describing the operation of the conventional disk array apparatus.

FIG. 1 shows a transition of a data attribute (data state) in a destination cache page on a cache memory in the conventional disk array apparatus when data is written into the cache memory while DIRTY data (data which had not been written into a disk drive) already exists in a write range within the cache page (cache page having the write range specified by a write request), and a transfer of the write data is normally completed. "DIRTY," "CLEAN," and "NULL" in the data state are identical in meaning to the respective data states in the present invention, later described.

Upon receipt of a write request from a host computer while DIRTY data already exists in a write range on a destination cache page (see (a) of FIG. 1), the conventional disk array apparatus stores write data from the host computer based on the write request in the cache page (completes a transfer of write data), and extends a range, the data state of which indicates "DIRTY" to the write range (see (b) of FIG. 1).

Figure 3:
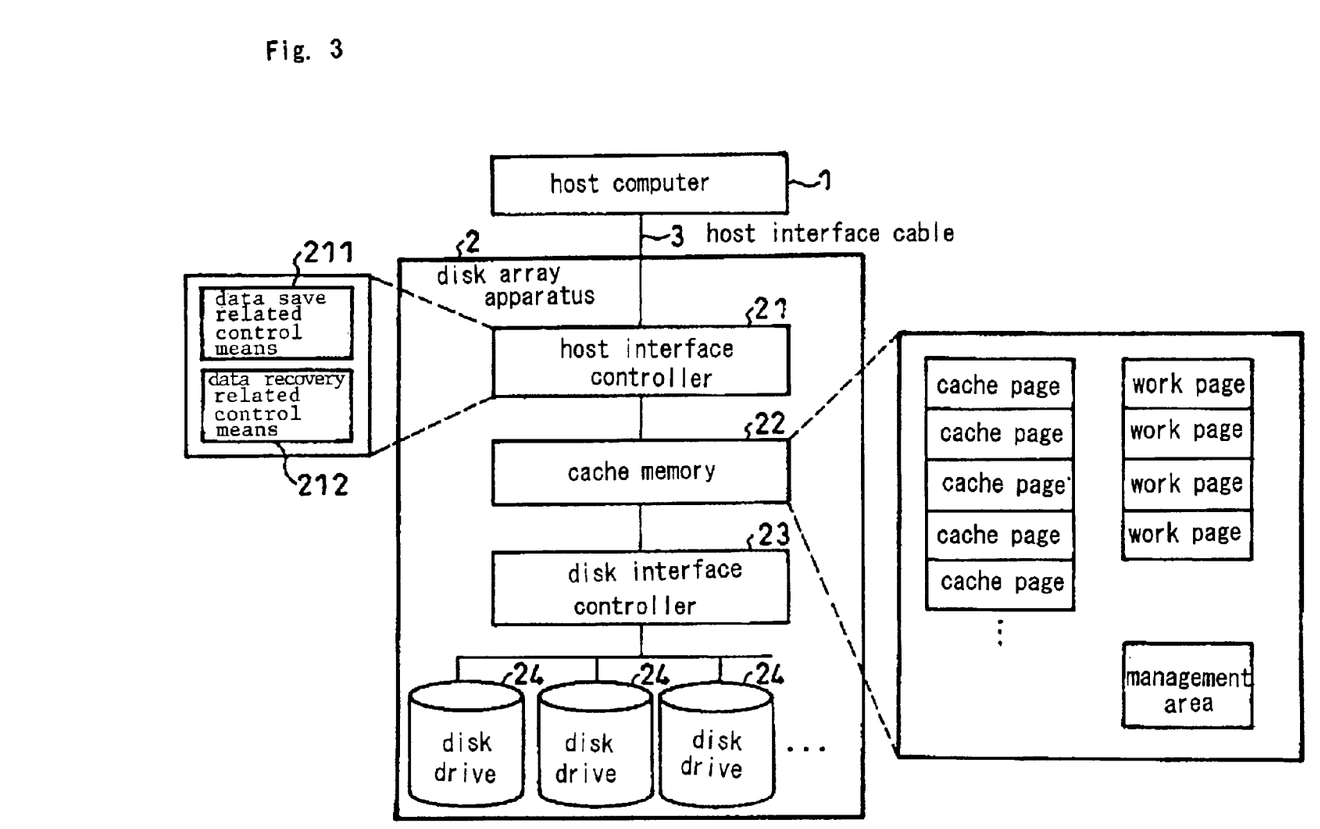
FIG. 3 is a block diagram illustrating the configuration of a computer system which includes a disk array apparatus according to a first embodiment of the present invention.

Further, as a disk interface controller in the disk array apparatus (interface controller similar to disk interface controller 23 shown in FIG. 3) writes the DIRTY data into the disk drive (write-back operation), the data state for the write range in the cache page is changed to "CLEAN" (CLEAN data refers to data which has been written into the disk drive)(see (c) of FIG. 1).

Figure 2:
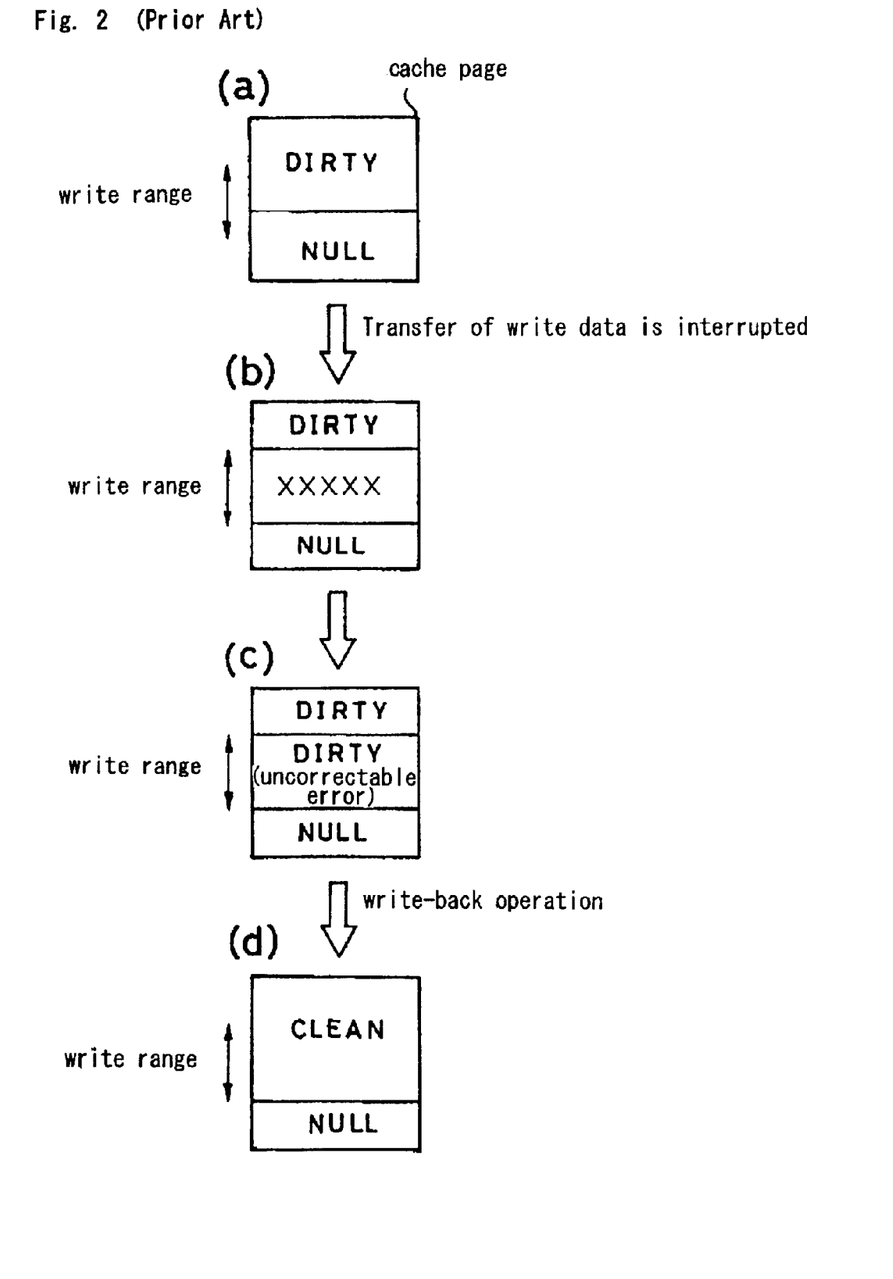
FIGS. 2(a) to 2(d) are diagrams for describing the operation of the conventional disk array apparatus.

FIG. 2 shows a transition of data state in a destination cache page on the cache memory in the conventional disk array apparatus when data is written into the cache memory while DIRTY data already exists in a write range within the cache page, and a transfer of the write data is interrupted.

Like the situation in FIG. 1, the conventional disk array apparatus starts a transfer of write data at the time it receives a write request from the host computer when DIRTY data already exists in the write range on the destination cache page (see (a) of FIG. 2).

In this event, when the transfer of write data is interrupted, contents of data cannot be ensured in the write range (indicated by "XXXXX" in (b) of FIG. 2).

To avoid possible problems, upon reading data in the write range within the cache page at a later time, the conventional disk array apparatus embeds the data with information (information indicative of an uncorrectable error) indicating that the data suffers from an uncorrectable error (the data cannot be corrected) (see (c) of FIG. 2).

Then, as the disk interface controller in the disk array apparatus writes the DIRTY data (DIRTY data including the uncorrectable data) into the disk drive (write-back operation), the data state for the write range in the cache page is changed to "CLEAN" (see (d) of FIG. 2).

In the conventional disk array apparatus described above, when data is written into the cache memory while DIRTY data already exists in a write range of a destination cache page, and a transfer of write data is interrupted, data before interruption of the write data transfer is corrupted (uncorrectable data), so that an application (application program) running on the host computer must recover data from a backup apparatus such as a magnetic tape drive or the like, thus giving rise to a problem that a long time is required for a recovery from a failure (recovery operation upon occurrence of a failure).

To avoid this problem, it is contemplated that a disk array apparatus is provided with an additional buffer memory to normally store write data from the host computer once in the buffer memory before the write data is transferred to the cache memory. However, this technique requires additional hardware (buffer memory), and data is transferred from the buffer memory to the cache memory every time, causing another problem that the write performance is significantly degraded.

SUMMARY OF THE INVENTION

In view of the problems mentioned above, it is an object of the present invention to provide a disk array apparatus which has a function of protecting prior data (before a transfer of write data is interrupted) even if a transfer of write data is interrupted, without additional hardware, while avoiding as much as possible the degradation in write performance.

Specifically, it is an object of the present invention to provide a disk array apparatus having a cache memory (disk array apparatus having a data protection function) which is capable of protecting data before interruption of a write data transfer even if the write data transfer is interrupted due to a failure in a host computer, a failure in a host interface cable, or the like (protecting data before the interruption of the write data transfer by retrieving data which has been saved on a work page in a cache memory when the transfer of write data from the host computer is interrupted), capable of reducing a time required for a recovery from a failure, and capable of improving the write performance.

A disk array apparatus according to the present invention has a cache memory. The cache memory includes a group of cache pages which are normal data areas, a group of work pages each for saving DIRTY data (data which has not been written into a disk drive) in an associated cache page, and a management area for managing a data state in each cache page. The disk array apparatus further comprises a host interface controller and a disk interface controller. The host interface controller includes data save related control means and data recovery related control means. The data save related control means, responsive to a write request from a host computer, writes write data transferred from the host computer into the cache memory, copies data in a portion in which a write range overlaps a DIRTY range to save the data into a work page on the cache memory when DIRTY data exists in the write range at the time the write data is written, and subsequently starts a transfer of the write data. The data recovery related control means monitors a write data transfer for interruption (interruption due to a failure in a host computer, a failure in a host interface cable, or the like). Upon interruption of the write data transfer, the data recovery related control means copies the data saved in the work page on the cache memory by the data save related control means to an associated cache page on the cache memory for recovering the data when it determines that the data has been saved in a work page (the data save related control means has saved DIRTY data into the work page). Also, upon interruption of the write data transfer, the data recovery related control means discards data in a write range and changing the data state for the write range to "NULL" when it determines that the data has not been saved in a work page. The disk interface controller periodically monitors the cache memory for DIRTY data, and when DIRTY data is found, the disk interface controller writes the DIRTY data into a disk drive asynchronously with a host I/O operation (I/O operation between the host computer and disk array apparatus).

More generally, the disk array apparatus according to the present invention can be represented by a disk array apparatus which comprises a cache memory, a host interface controller, and a disk interface controller. The cache memory includes a group of cache pages which are normal data areas, and a group of work pages each for saving DIRTY data in an associated cache page. When write data transferred from a host computer is written into the cache memory, the host interface controller saves data in a portion in which a write range overlaps a DIRTY range into a work page on the cache memory when DIRTY data exists in the write range on the cache memory. When a transfer of the write data is interrupted, the host interface controller retrieves the data saved in the work page on the cache memory to an associated cache page on the cache memory. The disk interface controller writes back the DIRTY data on the cache memory.

The present invention can also be implemented as a program for causing a disk array apparatus comprising a cache memory including a group of cache pages which are normal data areas, and a group of work pages each for saving DIRTY data in an associated cache page, and a plurality of disk drives to function as a host interface controller and a disk interface controller. Specifically, when write data transferred from a host computer is written into the cache memory, the host interface controller saves data in a portion in which a write range overlaps a DIRTY range into a work page on the cache memory when DIRTY data exists in the write range on the cache memory. When a transfer of the write data is interrupted, the host interface controller retrieves the data saved in the work page on the cache memory to an associated cache page on the cache memory. The disk interface controller is configured to write back the DIRTY data on the cache memory.

According to the present invention, even if a transfer of write data from a host computer is interrupted, data before the interrupt of the write data transfer can be protected irrespective of the presence or absence of DIRTY data (data which has not been written into a disk drive) in a write range in a destination cache page on the cache memory.

Advantageously, an application running on the host computer need not recover data from a backup apparatus such as a magnetic tap drive or the like, thereby making it possible to reduce a time required for a recovery operation upon occurrence of a failure.

In addition, since the present invention can be practiced only by using a portion of a cache memory as a group of work pages (work areas for saving data), the foregoing advantage can be provided at a low cost without requiring additional hardware.

Further, according to the present invention, it is essential only that data is saved when DIRTY data exists in a write range in a destination cache page on a cache memory, so that the degradation in write performance can be limited as compared with the conventional disk array apparatus which saves data each time a write request is issued.

The above and other objects, features, and advantages of the present invention will become apparent from the following description with reference to the accompanying drawings which illustrate examples of the present invention.

DETAILED DESCRIPTION OF THE PREFERRED EMBODIMENTS

The present invention is described in detail with reference to the accompanying drawings.

(1) First Embodiment

FIG. 3 is a block diagram illustrating the configuration of a computer system which includes disk array apparatus 2 according to a first embodiment of the present invention.

Referring to FIG. 3, disk array apparatus 2 according to the first embodiment is connected to host computer 1 through host interface cable 3.

Disk array apparatus 2 comprises host interface controller 21; cache memory 22; disk interface controller 23; and a plurality of disk drives 24.

Upon receipt of a write request (data write request) from host computer 1, host interface controller 21 stores data transferred from host computer 1 (write data) in a cache page (destination cache page) having a range (write range) corresponding to write addresses within cache memory 22. In this event, the data stored in the cache page is managed as data which has not been written into disk drive 24 (DIRTY data). At the time the write data has been transferred, host interface controller 21 returns a response indicative of the completion of data transfer to host computer 1.

Host interface controller 21 comprises data save related control means 211, and data recovery related control means 212.

Cache memory 22 comprises a group of cache pages (normal data areas classified into areas for storing data in certain bulk unit called a "cache page"); a group of work pages (assigned to correspond one-to-one to the cache pages) comprised of work pages (work areas for temporarily storing data) each for saving DIRTY data in a cache page associated therewith (the work pages may not be provided corresponding to all cache pages); and a management area for managing a data state in each cache page. Specifically, the management area manages the start address and data length of DIRTY data, and the start address and data length of CLEAN data (or data indicative of the absence of DIRTY data/CLEAN data if no such data exists) for each cache page.

Disk interface controller 23 periodically monitors cache memory 22 for DIRTY data, and writes DIRTY data into disk drive 24 asynchronously with a host I/O operation (I/O operation between host computer 1 and disk array apparatus 2) when the DIRTY data is found (this write processing is called the "write back operation"). With the write back operation, DIRTY data in cache memory 22 is written into disk drive 24, so that the DIRTY data becomes CLEAN data (the data state is changed from "DIRTY" to "CLEAN").

Figure 4:
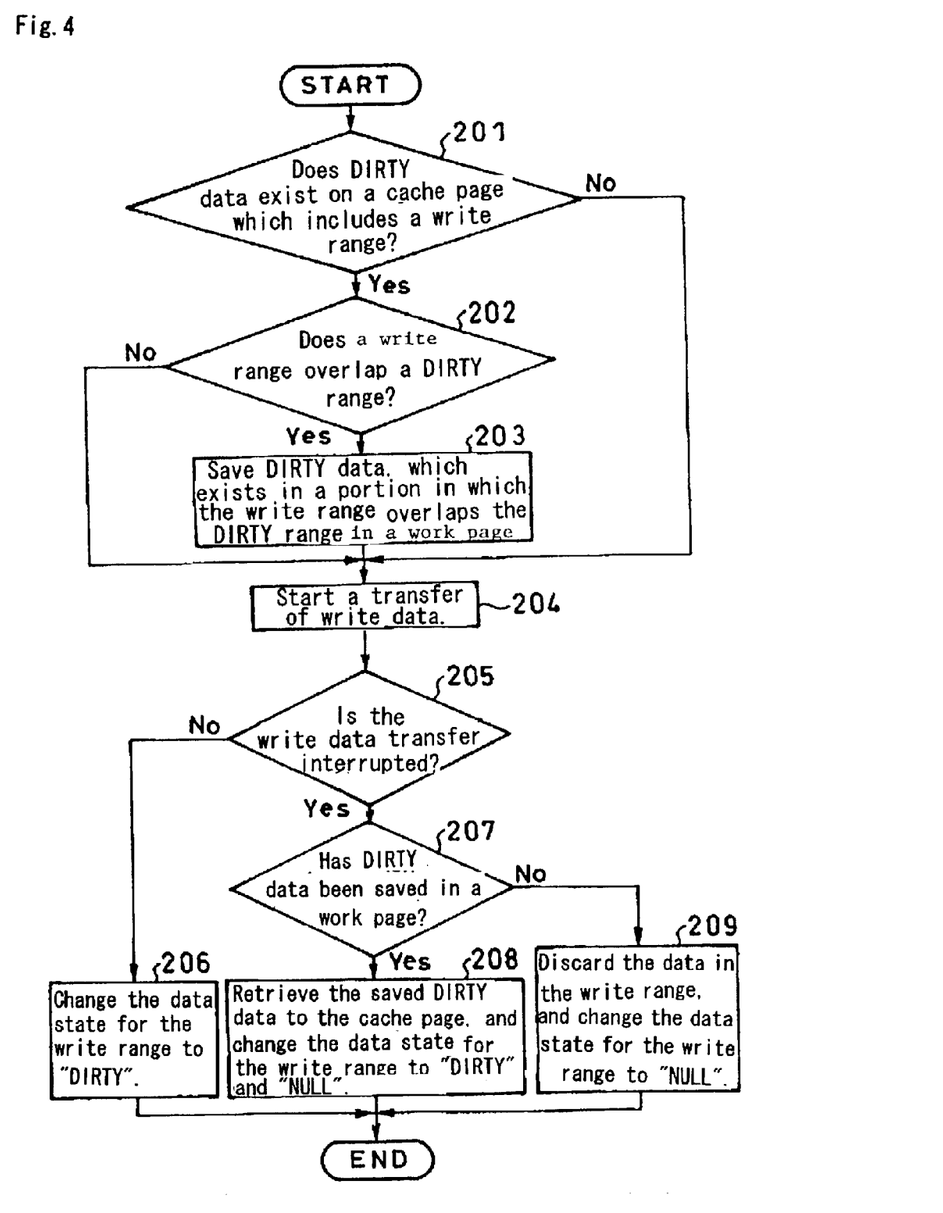
FIG. 4 is a flow chart illustrating the processing performed by a host interface controller in the disk array apparatus in FIG. 3.

FIG. 4 is a flow chart illustrating the processing performed by host interface controller 21. This processing comprises step 201 for determining the presence/absence of DIRTY data in a destination cache page; step 202 for determining whether a write range overlaps a DIRTY range; step 203 for saving overlapping data; step 204 for starting a transfer of write data; step 205 for determining whether or not a transfer of write data is interrupted; step 206 for changing the data state to "DIRTY"; step 207 for determining whether data has been saved; step 208 for retrieving saved DIRTY data; and step 209 for discarding data in a write range.

Figure 5:
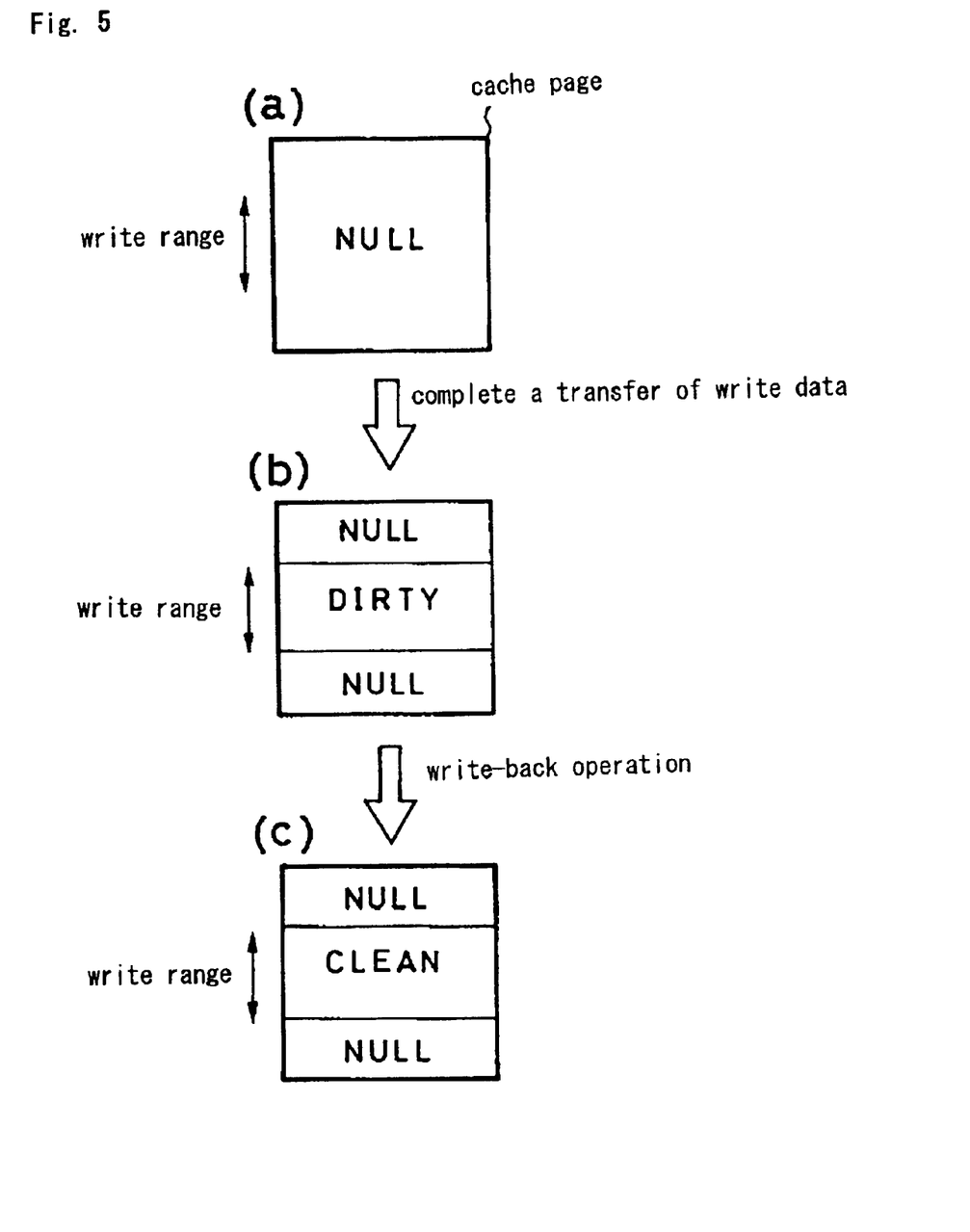
FIGS. 5(a) to 5(c) are diagrams for describing the specific operation of the disk array apparatus according to the first embodiment of the present invention.
Figure 6:
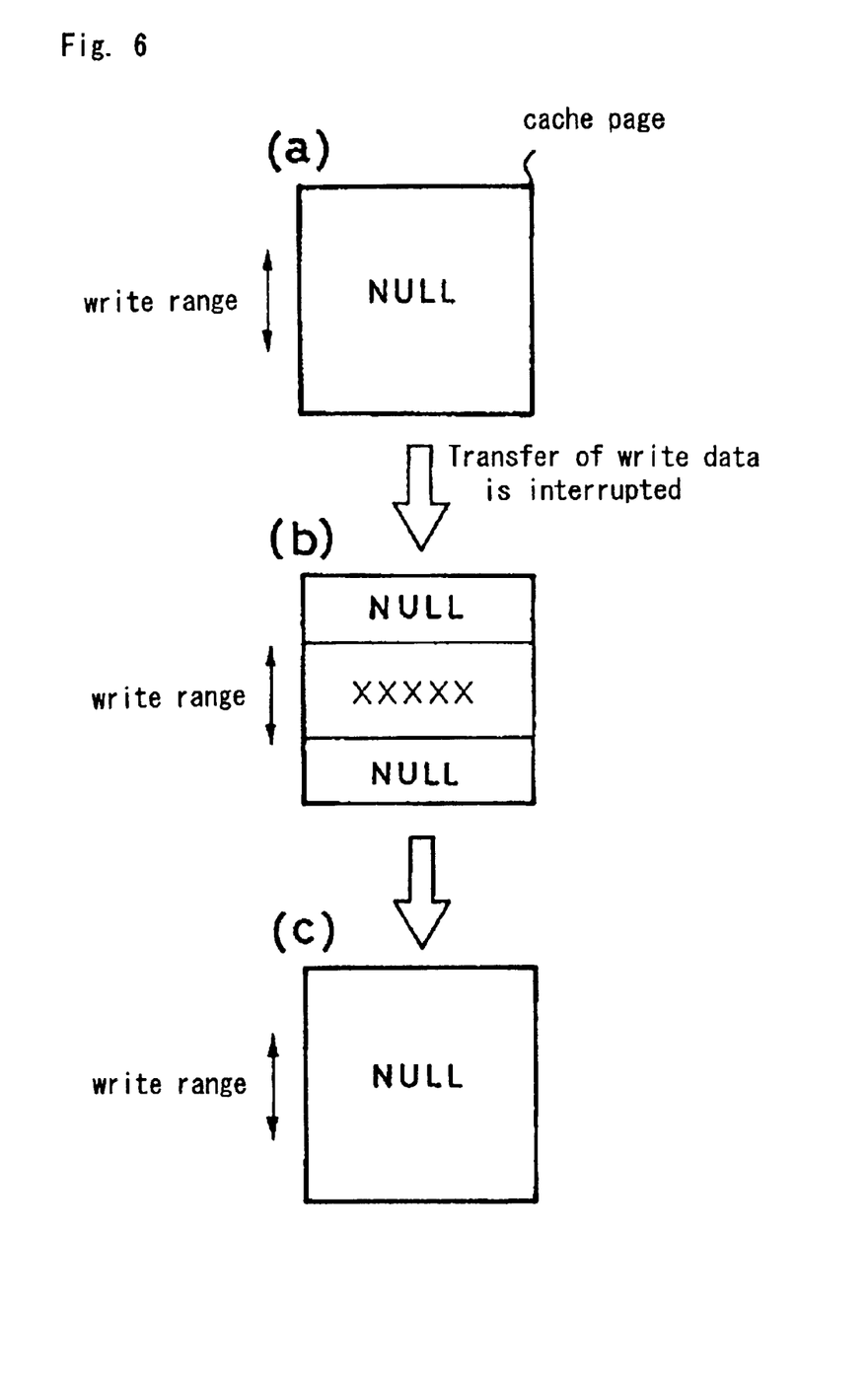
FIGS. 6(a) to 6(c) are diagrams for describing the specific operation of the disk array apparatus according to the first embodiment of the present invention.
Figure 7:
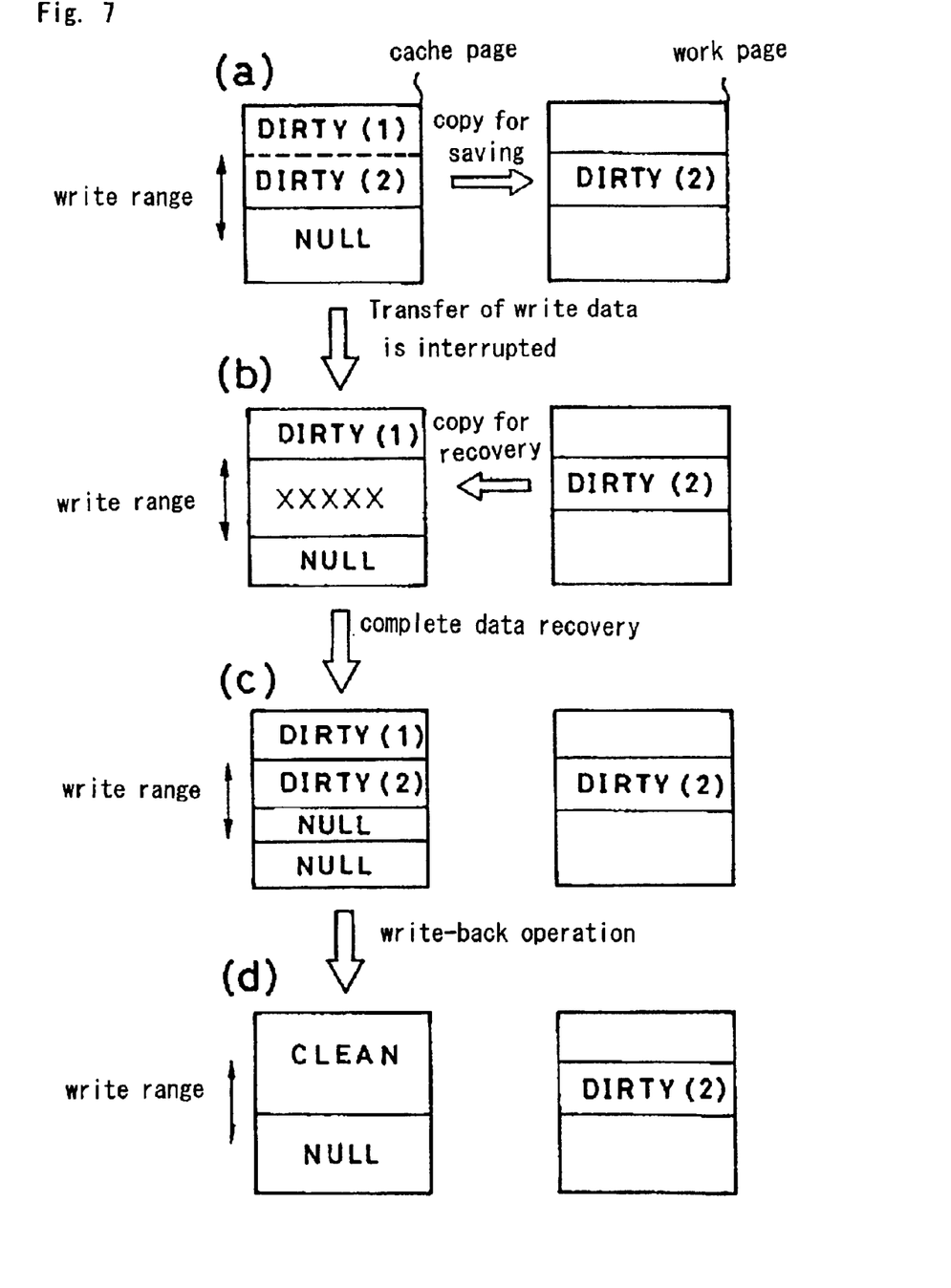
FIGS. 7(a) to 7(d) are diagrams for describing the specific operation of the disk array apparatus according to the first embodiment of the present invention.

FIGS. 5 to 7 are diagrams for describing the specific operation of disk array apparatus s according to the first embodiment (showing a transition of the data state in a destination cache page (cache page having a write range specified by a write request from host computer 1) on cache memory 22).

Referring next to FIGS. 3 to 7, detailed description will be made on the operation of disk array apparatus 2 according to the first embodiment (in FIG. 3) configured as described above.

Referring first to FIG. 4, description will be made on the general operation of host interface controller 21 in disk array apparatus 2.

Host interface controller 21 in disk array apparatus 2 performs the processing as illustrated in FIG. 4, upon receipt of a write request from host computer 1 through host interface cable 3.

First, data save related control means 211 performs the processing shown below based on the write request.

Data save related control means 211 first determines whether or not DIRTY data exists on a cache page (destination cache page) which includes a write range specified by the write request (range identified by write addresses on cache memory 22 and the length of data to be written) (step 201).

Determining at step 201 that DIRTY data exists on the destination cache page, data save related control means 211 determines whether or not the write range overlaps a DIRTY range (range in which the DIRTY data exists) (step 202).

Determining at step 202 that the write range overlaps the DIRTY range, data save related control means 211 saves DIRTY data, which exists in a portion in which the write range overlaps the DIRTY range (overlapping data), in a predetermined work page (work page corresponding to the cache page) (step 203).

On the other hand, determining at step 201 that no DIRTY data exists on the destination cache page, or determining at step 202 that the write range does not overlap the DIRTY range, or when the DIRTY data has been saved at step 203, data save related control means 211 starts a transfer of write data associated with the write request (step 204).

Subsequently, data recovery related control means 212 in host interface controller 21 performs the processing shown below in a process of the write data transfer started at step 204.

First, data recovery related control means 212 monitors (determines) whether or not the write data transfer is interrupted due to a failure in host computer 1, a failure in host interface cable 3, or the like until the write data transfer is completed (step 205).

Determining at step 205 that the write data transfer is not interrupted (when the write data transfer is completed without any interruption of the write data transfer), data recovery related control means 212 changes the data state for the write range to "DIRTY" (step 206).

On the other hand, determining at step 205 that the write data transfer is interrupted, data recovery related control means 212 determines whether or not DIRTY data (overlapping data) has been saved in a work page corresponding to the cache page (destination cache page) (step 207).

Determining at step 207 that the data has been saved, data recovery related control means 212 retrieves the saved DIRTY data from the work page to the cache page, and changes the data state for the write range to "DIRTY" and "NULL" (data state indicating that no effective data is stored) (step 208). Specifically, data recovery related control means 212 changes the data state for a portion of the write range in which the data was retrieved from the work page to "DIRTY" and the data state for the remaining portion of the write range except for the portion in which the data was retrieved (portion, the data state of which is not "DIRTY") to "NULL." On the other hand, determining at step 207 that the data has not been saved, data recovery related control means 212 discards the data in the write range, and changes the data state for the write range to "NULL" (step 209).

Second, description will be made on the operation of disk interface controller 23 in disk array apparatus 2 (the operation of disk interface controller 23 is similar to that in the prior art).

Disk interface controller 23 in disk array apparatus 2 periodically monitors cache memory 22 for DIRTY data, and upon detection of DIRTY data, writes the DIRTY data (DIRTY data which is protected even if the write data transfer is interrupted by the processing of host interface controller 21 as described above) in disk drive 24 asynchronously with a host I/O operation (write back operation).

As disk interface controller 23 writes DIRTY data into disk drive 24 (write-back operation), the data state for a range in which the DIRTY data has existed is changed to "CLEAN."

Third, the specific operation of the disk array apparatus (disk array apparatus 2) according to the first embodiment will be described with reference to FIGS. 5 to 7.

The following description will focus on a transition of the data state (data attribute) in a destination cache page on cache memory 22 for the following three cases (a)–(c).

(a) Referring first to FIG. 5, description will be made on the operation for writing data into a destination cache page when no effective data is stored in the cache page (the data state for the entire range of the cache page is "NULL." See (a) of FIG. 5).

In this case, upon receipt of a write request from host computer 1, host interface controller 21 determines at step 201 in FIG. 4 that no DIRTY data exists on the destination cache page, stores write data from host computer 1 in a write range on the cache page without any interruption of a data transfer (see steps 204 and 205 in FIG. 4), and changes the data state for the write range to "DIRTY" (see step 206 in FIG. 4, and (b) of FIG. 5).

As disk interface controller 23 writes (writes back) DIRTY data into disk drive 24 after the foregoing write processing, the data state for the write range on the destination cache page is changed to "CLEAN" (see (c) of FIG. 5).

(b) Referring next to FIG. 6, description will be made on the operation performed when a write data transfer is interrupted when data is being written into a destination cache page while no effective data is stored in the cache page (when the data state for the entire range of the cache page is "NULL." See (a) of FIG. 6). As discussed in Description of the Related Art, when a write data transfer is interrupted, data in a write range becomes indefinite (indicated by "XXXXX" in (b) of FIG. 6).

In this event, in the first embodiment, and accordingly in the present invention, host interface controller 21 discards data in a write range on a cache page which includes the write range (destination cache page) (changes the state for the write range to "NULL") (see step 209 in FIG. 4, and (c) of FIG. 6).

Thus, disk interface controller 23 does not write back the data into disk drive 24, so that the contents of data stored in disk drive 24 are maintained (uncorrectable data is stored in disk drive 24 in the prior art, whereas such storage is eliminated in the present invention).

(c) Referring finally to FIG. 7, description will be made on the operation performed when a write data transfer is interrupted when data is being written into a destination cache page while DIRTY data already exists in a write range on the cache page.

In this case (when DIRTY data already exists in the write range on the destination cache page), host interface controller 21 first copies data in a portion in which the write range overlaps a DIRTY range (overlapping data, i.e., DIRTY data in a range designated by "DIRTY(2)" in FIG. 7) for saving in a predetermined work page on cache memory 22 (work page corresponding to the cache page) (see step 203 in FIG. 4 and (a) of FIG. 7).

As the overlapping data has been saved, a transfer of write data is started from host computer 1 to the destination cache page (see step 204 in FIG. 4).

In the case illustrated in FIG. 7, since this write data transfer is interrupted, host interface controller 21 copies the data saved in the work page to the cache page for recovery (see step 208 in FIG. 4, and (b) of FIG. 7).

As the data recovery is completed, host interface controller 21 changes the data state for the portion in which the data has been recovered to "DIRTY" and changes the data state for a portion which is included in the write range but not in the DIRTY range to "NULL" (see (c) of FIG. 7).

With the foregoing operation, contents of DIRTY data which has existed on cache memory 22 prior to a write data transfer (data which has not been written into disk drive 24) are maintained even if the write data transfer is interrupted. Then, as disk interface controller 23 writes the DIRTY data into disk drive 24 (write-back operation), host interface controller 21 changes the data state for the write range in the cache page to "CLEAN" (see (d) of FIG. 7).

(2) Second Embodiment

Figure 8:
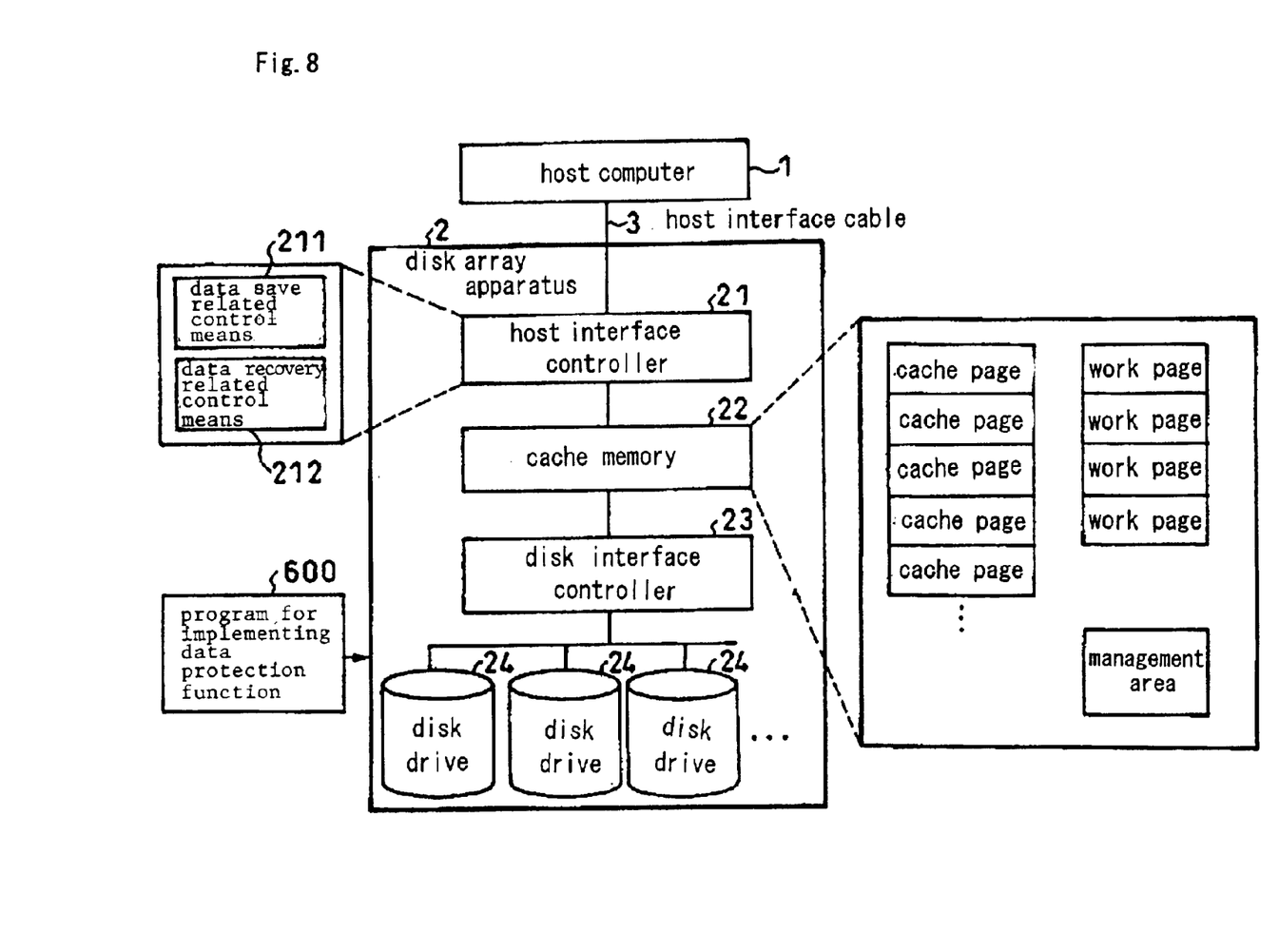
FIG. 8 is a block diagram illustrating the configuration of a disk array apparatus according to a second embodiment of the present invention.

FIG. 8 is a block diagram illustrating the configuration of a second embodiment of the present invention.

Referring to FIG. 8, the second embodiment of the present invention differs from the first embodiment illustrated in FIG. 3 in that the former comprises program 600 for implementing data protection function. Program 600 for implementing data protection function is read into disk array apparatus 2, which comprises cache memory 22 and a plurality of disk drives 24, for controlling the operation of disk array apparatus 2 as host interface controller 21 (data save related control means 211 and data recovery related control means 212) and disk interface controller 23. Since the operation of disk array apparatus 2 (host interface controller 21 and disk interface controller 23) under control of program 600 for implementing data protection function is completely identical to the operation of disk array apparatus 2 in the first embodiment, detailed description thereon is omitted.

(3) Modifications (Extensions) to Foregoing Embodiments

Modifications (extensions) can be contemplated for the first and second embodiments as shown in the following (a)–(c). (respective modifications may be combined into a different embodiment).

(a) In the foregoing embodiments, a write request involves writing data on a single cache page. However, a write range may extend over a plurality of cache pages, so that a plurality of cache pages can be specified as "destination cache pages."

(b) In the foregoing embodiments, the management area in cache memory 22 is provided for managing the start address and data length of DIRTY data, as well as the start address and data length of CLEAN data (or data indicative of the absence of DIRTY data/CLEAN data when such data does not exist) for each cache page. However, the contents of the management area are not limited to the foregoing as long as they clearly indicates ranges, the data state of which is set to "DIRTY," "CLEAN," and "NULL," in each cache page.

(c) In the foregoing embodiments, each work page on cache memory 22 corresponds one-to-one to any cache page. This correspondence is intended to avoid complicated control operations in save/retrieval of DIRTY data. However, the work page may be in any form as long as it can save overlapping data (DIRTY data in a portion in which a write range overlaps a DIRTY range) in an associated cache page, so that an entire area of a work page need not always correspond one-to-one to an entire area of a cache page.

While preferred embodiments of the present invention have been described using specific terms, such description is for illustrative purposes only, and it is to be understood that changes and variations may be made without departing from the spirit or scope of the following claims.

What is claimed is:

1. A disk array apparatus comprising:
   a cache memory mounted in said disk array apparatus, said cache memory including a group of cache pages which are normal data areas, and a group of work pages each for saving DIRTY data in an associated cache page;
   a host interface controller, operative when write data transferred from a host computer is written into said cache memory, for saving data in a portion in which a write range overlaps a DIRTY range into a work page on said cache memory when DIRTY data exists in the write range on said cache memory, and for retrieving the data saved in the work page on said cache memory to the associated cache page on said cache memory when a transfer of the write data is interrupted; and a disk interface controller for writing back the DIRTY data on said cache memory.

2. A disk array apparatus comprising:

a cache memory mounted in said disk array apparatus, said cache memory including a group of cache pages which are normal data areas, a group of work pages each for saving DIRTY data in an associated cache page, and a management area for managing a data state in each said cache page;

a host interface controller including:

data save related control means responsive to a write request from a host computer for writing write data transferred from the host computer into said cache memory, copying data in a portion in which a write range on said cache memory overlaps a DIRTY range to save the data into a work page on said cache memory when DIRTY data exists in the write range at a time the write data is written, and subsequently starting a transfer of the write data; and data recovery related control means for monitoring a write data transfer for interruption, said data recovery related control means, operative when the write data transfer is interrupted and when said data recovery related control means determines that the data has been saved in a work page, for copying the data saved in the work page on said cache memory by said data save related control means to the associated cache page on said cache memory for recovering the data, said data recovery related control means further operative when the write data transfer is interrupted and when said data recovery related control means determines that the data has not been saved in a work page for discarding data in a write range and changing a data state for said write range to "NULL"; and a disk interface controller for periodically monitoring said cache memory for DIRTY data, said disk interface controller operative when DIRTY data is found for writing the DIRTY data into a disk drive asynchronously with a host I/O operation.

3. The disk array apparatus according to claim 2, wherein said management area stores a start address and a data length of DIRTY data, and a start address and a data length of CLEAN data for each cache page.

4. A disk array apparatus according to claim 1, wherein an entire area of a certain cache page corresponds one-to-one to an entire area of a work page for saving DIRTY data in said cache page.

5. A disk array apparatus according to claim 2, wherein an entire area of a certain cache page corresponds one-to-one to an entire area of a work page for saving DIRTY data in said cache page.

6. A disk array apparatus according to claim 3, wherein an entire area of a certain cache page corresponds one-to-one to an entire area of a work page for saving DIRTY data in said cache page.

7. A program for causing a disk array apparatus comprising a cache memory including a group of cache pages which are normal data areas, and a group of work pages each for saving DIRTY data in an associated cache page, and a plurality of disk drives to function as:

a host interface controller, operative when write data transferred from a host computer is written into said cache memory, for saving data in a portion in which a write range overlaps a DIRTY range into a work page on said cache memory when DIRTY data exists in the write range on said cache memory, and for retrieving the data saved in the work page on said cache memory to the associated cache page on said cache memory when a transfer of the write data is interrupted; and a disk interface controller for writing back the DIRTY data on said cache memory.

8. A program for causing a disk array apparatus comprising a cache memory including a group of cache pages which are normal data areas, a group of work pages each for saving DIRTY data in an associated cache page, and a management area for managing a data state in each said cache page, and a plurality of disk drives to function as:

data save related control means in a host interface controller responsive to a write request from a host computer for writing write data transferred from the host computer into said cache memory, copying data in a portion in which a write range on said cache memory overlaps a DIRTY range to save the data into a work page on said cache memory when DIRTY data exists in the write range at a time the write data is written, and subsequently starting a transfer of the write data;

data recovery related control means in a host interface controller for monitoring a write data transfer for interruption, said data recovery related control means, operative when the write data transfer is interrupted and when said data recovery related control means determines that the data has been saved in a work page, for copying the data saved in the work page on said cache memory by said data save related control means to the associated cache page on said cache memory for recovering the data, said data recovery related control means further operative when the write data transfer is interrupted and when said data recovery related control means determines that the data has not been saved in a work page for discarding data in a write range and changing a data state for said write range to "NULL"; and a disk interface controller for periodically monitoring said cache memory for DIRTY data, said disk interface controller operative when DIRTY data is found for writing the DIRTY data into a disk drive asynchronously with a host I/O operation.

9. A computer readable storage medium recording a program to be executed by a computer, said program comprising:

instructions for a disk array apparatus comprising a cache memory including a group of cache pages which are normal data areas, and a group of work pages each for saving DIRTY data in an associated cache page, and a plurality of disk drives to function as:

a host interface controller, operative when write data transferred from a host computer is written into said cache memory, for saving data in a portion in which a write range overlaps a DIRTY range into a work page on said cache memory when DIRTY data exists in the write range on said cache memory, and for retrieving the data saved in the work page on said cache memory to the associated cache page on said cache memory when a transfer of the write data is interrupted; and a disk interface controller for writing back the DIRTY data on said cache memory.

10. A computer readable storage medium recording a program to be executed by a computer, said program comprising:

instructions for a disk array apparatus comprising a cache memory including a group of cache pages which are normal data areas, a group of work pages each for saving DIRTY data in an associated cache page, and a management area for managing a data state in each said cache page, and a plurality of disk drives to function as:

data save related control means in a host interface controller responsive to a write request from a host computer for writing write data transferred from the host computer into said cache memory, copying data in a portion in which a write range on said cache memory overlaps a DIRTY range to save the data into a work page on said cache memory when DIRTY data exists in the write range at a time the write data is written, and subsequently starting a transfer of the write data;

data recovery related control means in a host interface controller for monitoring a write data transfer for interruption, said data recovery related control means, operative when the write data transfer is interrupted and when said data recovery related control means detennines that the data has been saved in a work page, for copying the data saved in the work page on said cache memory by said data save related control means to the associated cache page on said cache memory for recovering the data, said data recovery related control means further operative when the write data transfer is interrupted and when said data recovery related control means determines that the data has not been saved in a work page for discarding data in a write range and changing a data state for said write range to "NULL"; and a disk interface controller for periodically monitoring said cache memory for DIRTY data, said disk interface controller operative when DIRTY data is found for writing the DIRTY data into a disk drive asynchronously with a host I/O operation.

* * * * *

UNITED STATES PATENT AND TRADEMARK OFFICE
CERTIFICATE OF CORRECTION

| | | |
|---|---|---|
| PATENT NO. | : 6,931,485 B2 | Page 1 of 1 |
| APPLICATION NO. | : 10/216564 | |
| DATED | : August 16, 2005 | |
| INVENTOR(S) | : Takao Aigo | |

It is certified that error appears in the above-identified patent and that said Letters Patent is hereby corrected as shown below:

Col. 12, line 4 (claim 10) delete "detennines", insert --determines--

Signed and Sealed this

Fifth Day of September, 2006

JON W. DUDAS
*Director of the United States Patent and Trademark Office*